United States Patent Office 3,259,840
Patented July 5, 1966

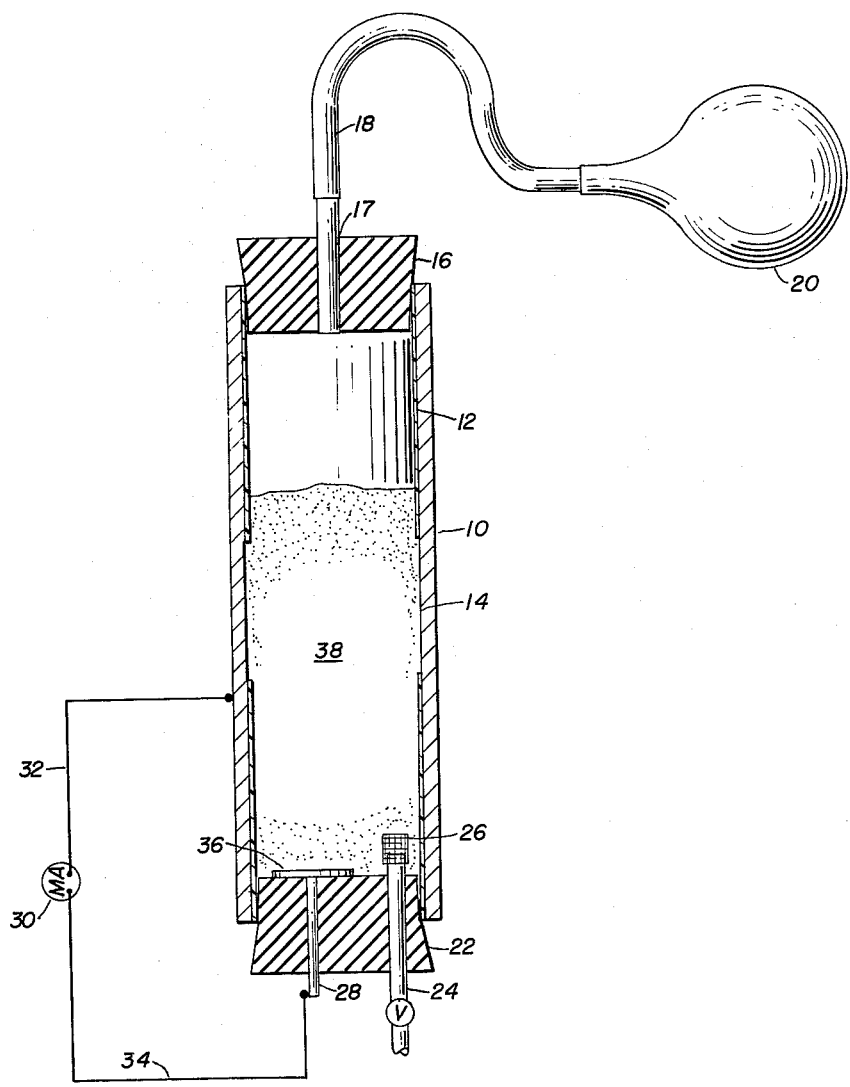

---

3,259,840
APPARATUS AND METHOD FOR DETERMINING SOIL CORROSITIVITY
Edward Schaschl and Glenn A. Marsh, Crystal Lake, Ill., assignors, by mesne assignments, to Union Oil Company of California, Los Angeles, Calif., a corporation of California
Filed May 4, 1962, Ser. No. 192,424
8 Claims. (Cl. 324—29)

This invention relates to an apparatus for determining the relative corrositivity of soil samples.

In laying out the routes for cross-country pipelines it is desirable to determine the corrosive nature of the soils in which the pipe must be laid. It is also desirable to evaluate the nature of soils in which corrodible structures, especially steel structures, are to be erected. This is especially true with respect to the possibility of environments in which long-cell corrosion might occur. Unfortunately, the determination of the likelihood of conditions conducive to long-cell corrosion has been difficult or impossible in the past.

Now, in accordance with this invention, an apparatus and method has been devised for the rapid determination of the corrosive nature of soil samples, such as samples taken along the proposed routes of cross-country pipelines. It is therefore a primary purpose of this invention to provide a method and means for rapidly determining the corrosive character of soil samples. It is a particular object of this invention to evaluate soil samples with respect to long-cell corrosion characteristics.

Broadly, the apparatus of this invention comprises a container in which a sample of soil may be placed, and two electrodes, one positioned near the bottom of the container and the other positioned above the bottom of the container, an opening by which a soil sample and liquid can be introduced to the container, and a drain by which liquid can be removed from the container. A galvanometer is provided for measuring the short-circuit current between the two electrodes. In practice, a soil sample is placed in the vessel, the voids of the soil are filled by adding sufficient water to saturate the sample, the water is drained off to leave the soil surrounding the upper electrode saturated with air, and the short-circuit current between the upper electrode and lower electrode is determined. The magnitude of this current is indicative of the long-cell corrosive nature of the soil being studied.

The invention is best described with reference to the drawing, which shows a steel tube 10, the interior surface of which is coated with a layer 12 of electrically insulating material, such as epoxy resin, but with a bare area 14 at which an annular zone of tube surface of predetermined area is exposed, thereby forming an electrode. A rubber stopper 16, which forms a closure for the top of the tube, is provided with an opening 17 through which conduit 18 communicates. Conduit 18, which is preferably flexible, connects with a conventional rubber aspirator-bulb 20 which serves as an air pump. Rubber stopper 22, which serves as a closure for the bottom of the tube, and cooperates with the tube to form a container, is provided with an opening to accommodate a valve-controlled drain tube 24 which terminates within the tube 10, adjacent to the stopper. A filter screen 26 is provided so that water can be drained from the soil sample without disturbing the soil itself. Stopper 22 is also provided with an opening which accommodates the electrode 28 which extends through the stopper and into the tube. Milliammeter 30 is connected to the tube 10 by conductor 32, and to electrode 28 by conductor 34. Electrode 28 is adapted to provide a surface of suitable area at 36 within the tube 10.

In use, soil sample 38 is placed within the container formed by tube 10 and stopper 22 and, with stopper 16 removed, water is added to cover the soil sample. After the sample has become saturated with water, water is drained through drain 24 to a level below that of exposed surface 14 of tube 10, thereby leaving electrode 14 in contact with soil saturated with air. Electrode 28 can be left submerged in water. Draining the soil is facilitated by replacing stopper 16 and pumping air into the vessel. Finally, the amount of current flowing between electrodes 14 and 28 is measured under short circuit conditions by means of microammeter 30.

The invention has been demonstrated experimentally by means of apparatus as shown and described, constructed of steel pipe coated in part with an epoxy resin. The area of the exposed surface of the pipe was two square inches, while the area of the lower electrode 28 was one square inch.

In one experiment, the vessel was filled with fine sand, and an aqueous sodium chloride solution was added to cover the sand. Then the top stopper was put in place and the brine was drained to expose the upper electrode, while air was pumped in by means of the squeeze bulb. As a result, a galvanic cell was created with the upper, cathodic electrode in contact with aerated damp soil, and the bottom electrode in contact with soil and brine. The current was about 400 microamperes. In another experiment, where coarse sand was used instead of fine sand, the current was 350 microamperes. In another experiment, where a 50–50 mixture of coarse and fine sand was used, the current was only 90 microamperes. And in still another experiment, where 0.25% bentonite clay was mixed with fine sand, the current was 300 microamperes.

Thus, it is apparent that the apparatus and method, and the current determined thereby, can clearly distinguish between various types of soil. When used in the field, this invention makes possible rapid determination of the corrosivity of selected samples. The two electrode surfaces may be fabricated of any of a wide variety of dissimilar metals provided that the upper electrode 14 is of a metal cathodic to electrode 28, and electrode 28 is of a metal which dissolves readily under galvanic action, such as iron, zinc, aluminum, or magnesium. The upper electrode 14 can be of steel, while the lower electrode can be of some more anodic metal, such as zinc. The area relationships of the two electrodes are not critical, but it is preferred that the cathodic upper electrode have an area in a range of 1 to 5 times that of the anodic lower electrode.

The embodiments in the invention in which an exclutive property or privilege is claimed are defined as follows:

1. The method of determining the corrosivity of a soil sample as a function of measured galvanic current comprising
    (A) contacting a confined comminuted soil sample with an upper electrode and a lower electrode spaced from each other, said lower electrode being anodic with respect to said upper electrode,
    (B) mixing with said confined soil sample an amount of aqueous liquid in excess of the amount required to saturate said sample,
    (C) draining from said sample aqueous liquid until the level thereof is below that of the upper electrode but above that of the lower electrode, and
    (D) measuring the generated current passing between said electrodes.

2. The method in accordance with claim 1 in which drainage of aqueous liquid from the sample is speeded by introducing air under superatmospheric pressure above the sample while draining water from the bottom.

3. An apparatus for determining corrosivity of a soil sample comprising
 (A) an elongated container made of electrically conductive metal,
 (B) means formed of electrical insulating material for opening and closing the opposite ends of said container,
 (C) an electrode anodic with respect to said container metal, extending through one of said means into one end of said container,
 (D) the inner wall of said container being bare at a point remote from said electrode and being covered with electrical insulating material in the vicinity of said electrode,
 (E) a valved liquid conduit communicating the interior of same end of said container as that through which the electrode extends, with the exterior of the container,
 (F) an air pump communicating with the other end of said container,
 (G) a strainer covering the inner end of said conduit suitable for permitting liquid to pass therethrough but to prevent soil from passing therethrough, and
 (H) current measuring means connected to the wall of said container and to said electrode.

4. An apparatus in accordance with claim 3 in which said metals are zinc and iron.

5. An apparatus in accordance with claim 3 in which said electrical insulating material coats so much of the interior wall of said tube as to leave exposed an area about 1 to 5 times the exposed area of said electrode.

6. An apparatus in accordance with claim 3 including a second closure adapted to mate with the other end of said tube, and means for pumping air at superatmospheric pressure into said tube adjacent to the second-closure end thereof.

7. An apparatus in accordance with claim 3 in which said tube is of a ferrous metal.

8. An apparatus in accordance with claim 3 in which said electrode is fabricated of zinc.

References Cited by the Examiner
UNITED STATES PATENTS

| | | | |
|---|---|---|---|
| 736,411 | 8/1903 | Leonard | 324—9 X |
| 1,497,388 | 6/1924 | Sterling | 324—29.5 X |
| 1,520,865 | 12/1924 | Heyer | 324—29.5 |
| 2,714,189 | 7/1955 | Ballard | 324—30 |
| 2,914,725 | 11/1959 | Carter | 324—30 |

WALTER L. CARLSON, *Primary Examiner.*

C. A. S. HAMRICK, C. F. ROBERTS,
*Assistant Examiners.*